United States Patent
Davidson

(10) Patent No.: US 7,615,138 B2
(45) Date of Patent: Nov. 10, 2009

(54) ELECTROLYSIS APPARATUS WITH PULSED, DUAL VOLTAGE, MULTI-COMPOSITION ELECTRODE ASSEMBLY

(75) Inventor: Nehemia Davidson, 32/3 Granit Street 48541, Rosh-Haayin (IL)

(73) Assignee: Nehemia Davidson (IL)

( * ) Notice: Subject to any disclaimer, the term of this patent is extended or adjusted under 35 U.S.C. 154(b) by 237 days.

(21) Appl. No.: 11/707,460

(22) Filed: Feb. 13, 2007

(65) Prior Publication Data
US 2007/0284244 A1 Dec. 13, 2007

Related U.S. Application Data

(63) Continuation-in-part of application No. 11/450,042, filed on Jun. 9, 2006, now abandoned.

(51) Int. Cl.
*C25B 1/04* (2006.01)
(52) U.S. Cl. .................. 204/230.7; 204/230.8; 204/252
(58) Field of Classification Search .............. 204/230.5, 204/230.7; 205/628, 629, 630, 631, 632
See application file for complete search history.

(56) References Cited

U.S. PATENT DOCUMENTS

| | | | |
|---|---|---|---|
| 3,892,653 A * | 7/1975 | Pacheco | 204/238 |
| 3,954,592 A | 5/1976 | Horvath | |
| 4,184,931 A | 1/1980 | Inoue | |
| 4,394,231 A | 7/1983 | Nicolas | |
| 4,457,816 A | 7/1984 | Galluzzo et al. | |
| 4,463,063 A * | 7/1984 | Adlhart | 429/19 |
| 4,726,888 A | 2/1988 | McCambridge | |
| 4,822,469 A | 4/1989 | Shimomura et al. | |
| 4,936,961 A | 6/1990 | Meyer | |
| 5,089,107 A * | 2/1992 | Pacheco | 204/230.2 |
| 5,879,522 A | 3/1999 | Shaaban et al. | |
| 6,126,794 A | 10/2000 | Chambers | |
| 6,419,815 B1 | 7/2002 | Chambers | |
| 6,638,413 B1 | 10/2003 | Weinberg et al. | |
| 6,890,410 B2 | 5/2005 | Sullivan | |
| 6,977,120 B2 | 12/2005 | Chou et al. | |
| 2004/0009392 A1* | 1/2004 | Petillo et al. | 429/122 |
| 2005/0016840 A1* | 1/2005 | Petillo | 204/248 |

* cited by examiner

*Primary Examiner*—Harry D Wilkins, III
(74) *Attorney, Agent, or Firm*—Patent Law Office of David G. Beck

(57) ABSTRACT

An electrolysis system (100) is provided. In addition to an electrolysis tank (101) and a membrane (105) separating the tank into two regions, the system includes at least one pair of low voltage electrodes (115/117) of a first type comprised of a first material, at least one pair of low voltage electrodes (117/118) of a second type comprised of a second material different from the first material, and at least one pair of high voltage electrodes (121/122) comprised of a material that may be the same as either the first or second material or different from both the first and second material. The low voltage applied to the low voltage electrodes and the high voltage applied to the high voltage electrodes is pulsed with the pulses occurring simultaneously with the same pulse duration.

33 Claims, 16 Drawing Sheets

ELECTROLYSIS APPARATUS WITH PULSED, DUAL VOLTAGE, MULTI-COMPOSITION ELECTRODE ASSEMBLY

CROSS-REFERENCES TO RELATED APPLICATIONS

This application is a continuation-in-part of U.S. patent application Ser. No. 11/450,042, filed Jun. 9, 2006 now abandoned.

FIELD OF THE INVENTION

The present invention relates generally to electrolysis systems and, more particularly, to a high efficiency electrolysis system.

BACKGROUND OF THE INVENTION

Fossil fuels, in particular oil, coal and natural gas, represent the primary sources of energy in today's world. Unfortunately in a world of rapidly increasing energy needs, dependence on any energy source of finite size and limited regional availability has dire consequences for the world's economy. In particular, as a country's need for energy increases, so does its vulnerability to disruption in the supply of that energy source. Additionally, as fossil fuels are the largest single source of carbon dioxide emissions, a greenhouse gas, continued reliance on such fuels can be expected to lead to continued global warming. Accordingly it is imperative that alternative, clean and renewable energy sources be developed that can replace fossil fuels.

Hydrogen-based fuel is currently one of the leading contenders to replace fossil fuel. However in order to successfully transition from oil-based and coal-based fuels to a hydrogen-based fuel, significant improvements must be made in terms of hydrogen production, hydrogen storage and distribution, and hydrogen engines. Clearly the state of the art in each of these developmental areas impacts the other areas. For example, if a method of inexpensively producing hydrogen in small production plants can be developed, production plants can be situated close to the end user, thus avoiding the need for extremely complex and costly distribution systems.

Although a number of techniques can be used to produce hydrogen, the primary technique is by steam reforming natural gas. In this process thermal energy is used to react natural gas with steam, creating hydrogen and carbon dioxide. Although this process is well developed, due to its reliance on fossil fuels and the release of carbon dioxide during production, it does not alleviate the need for fossil fuels nor does it lower the environmental impact of its use over that of traditional fossil fuels. Other, less developed hydrogen producing techniques include (i) biomass fermentation in which methane fermentation of high moisture content biomass creates fuel gas, a small portion of which is hydrogen; (ii) biological water splitting in which certain photosynthetic microbes produce hydrogen from water during their metabolic activities; (iii) photoelectrochemical processes using either soluble metal complexes as a catalyst or semiconducting electrodes in a photochemical cell; (iv) thermochemical water splitting using chemicals such as bromine or iodine, assisted by heat, to split water molecules; (v) thermolysis in which concentrated solar energy is used to generate temperatures high enough to split methane into hydrogen and carbon; and (vi) electrolysis.

Electrolysis as a means of producing hydrogen has been known and used for over 80 years. In general, electrolysis of water uses two electrodes separated by an ion conducting electrolyte. During the process hydrogen is produced at the cathode and oxygen is produced at the anode, the two reaction areas separated by an ion conducting diaphragm. Electricity is required to drive the process. An alternative to conventional electrolysis is high temperature electrolysis, also known as steam electrolysis. This process uses heat, for example produced by a solar concentrator, as a portion of the energy required to cause the needed reaction. Although lowering the electrical consumption of the process is desirable, this process has proven difficult to implement due to the tendency of the hydrogen and oxygen to recombine at the technique's high operating temperatures.

Although a variety of improvements have been devised to improve upon the efficiency of the electrolytic hydrogen production system, to date none of them have been able to make the process efficient enough to make hydrogen-based fuel a viable alternative to fossil fuels. Accordingly, what is needed in the art is a means for efficiently producing hydrogen, the means preferably being small enough to minimize the need for an overly complex distribution system. The present invention provides such a system.

SUMMARY OF THE INVENTION

The present invention provides a system for achieving high hydrogen output flow rates utilizing electrolysis. In addition to an electrolysis tank, a membrane separating the tank into two regions, hydrogen gas and oxygen gas outlets, and means for filling the tank with electrolyte containing water, the system includes three types of electrodes. For each type of electrode, the system includes at least one pair of electrodes, with each pair of electrodes including a cathode and an anode.

The first and second types of electrodes are connected to a low voltage source(s) while the third type of electrode is connected to a high voltage source. The first and second types of electrodes are positioned between the third type of electrodes, i.e., the separation distance between the high voltage electrodes is greater than the separation distance of either the first or second types of low voltage electrodes. The power supplied by both the low and high voltage sources to the three types of electrodes is simultaneously pulsed, preferably at a frequency between 50 Hz and 5 kHz and with a pulse duration of between 10 nanoseconds and 0.5 seconds. Preferably the ratio of the high voltage to the low voltage is at least 5:1, more preferably within the range of 5:1 to 20:1, with a low voltage of between 3 and 1500 volts, more preferably within the range of 12 to 750 volts, and with a high voltage of between 50 volts and 50 kilovolts, more preferably within the range of 100 volts and 5 kilovolts. The first and second types of electrodes are fabricated from different materials. The first, second and third types of electrodes can utilize any combination of surface shapes, including flat and curved. Each pair, i.e., cathode and anode, of electrodes of each type can either be positioned parallel to one another, or not parallel to one another. Although the electrodes can be fabricated from a variety of materials, preferably the material for each electrode type is selected from the group consisting of steel, nickel, copper, iron, stainless steel, cobalt, manganese, zinc, titanium, platinum, and alloys thereof.

In at least one embodiment of the invention, the membrane separating the electrolysis tank into two regions is comprised of polypropylene.

In at least one embodiment of the invention, the concentration of electrolyte in the water is between 0.05 and 0.5 percent by weight. Preferably potassium hydroxide is used as the electrolyte.

A further understanding of the nature and advantages of the present invention may be realized by reference to the remaining portions of the specification and the drawings.

DESCRIPTION OF THE SPECIFIC EMBODIMENTS

Figure 1:
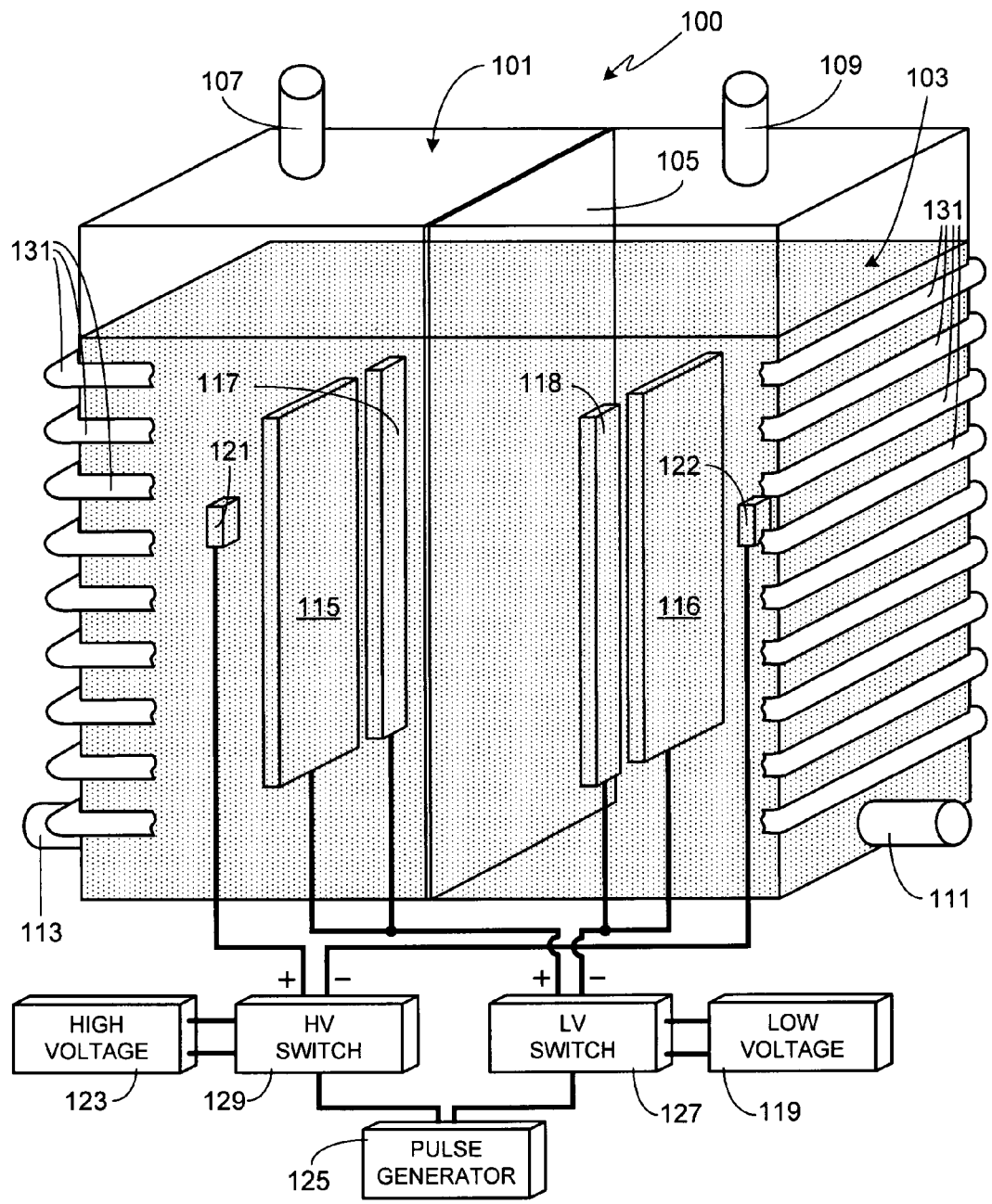
FIG. 1 is an illustration of an exemplary, and preferred, embodiment of the invention.

FIG. 1 is an illustration of an exemplary, and preferred, embodiment of the invention which is used to produce large quantities of hydrogen. Electrolysis system 100 includes a tank 101 comprised of a non-conductive material, the size of the tank depending primarily upon the desired output level for the system, for example the desired quantity/flow rate of hydrogen to be generated. Although tank 101 is shown as having a rectangular shape, it will be appreciated that the invention is not so limited and that tank 101 can utilize other shapes, for example cylindrical, square, irregularly-shaped, etc. Tank 101 is substantially filled with water 103. Within water 103 is an electrolyte, the electrolyte necessary to achieve the desired level of conductivity within the water. A preferred electrolyte is potassium hydroxide, although the invention is not limited to this specific electrolyte. For example, sodium hydroxide can also be used. Although a typical electrolysis system used to decompose water into hydrogen and oxygen gases will utilize relatively high concentrations of electrolyte, the present invention has been found to work best with relatively low electrolyte concentrations, thereby maintaining a relatively high water resistivity (e.g., typically on the order of 1 to 2 mega ohms). Note that this resistivity is based on the initial resistance of the water since typically after the system has been operating for a while (for example, on the order of 5 to 6 hours), the resistivity of the water has been found to drop. In at least one preferred embodiment of the invention, an electrolyte concentration of between 0.05 percent and 0.5 percent by weight, and more preferably an electrolyte concentration of 0.2 percent by weight, is used.

Separating tank 101 into two regions is a membrane 105. Membrane 105 permits ion/electron exchange between the two regions of tank 101 while keeping separate the oxygen and hydrogen bubbles produced during electrolysis. Maintaining separate hydrogen and oxygen gas regions is important both as a means of allowing the collection of pure hydrogen gas and pure oxygen gas, but also as a means of minimizing the risk of explosions due to the inadvertent recombination of the two gases. In addition to permitting ion/electron transfer while segregating the produced hydrogen and oxygen gases, the material comprising membrane 105 is also selected based on its ability to withstand the temperatures generated by the electrolysis process. Accordingly, in at least one preferred embodiment the material comprising membrane 105 is selected to be able to withstand a temperature of at least 90° C. without suffering from any material degradation. As is well known by those of skill in the art, there are a variety of materials that meet all of these criteria, exemplary materials including polypropylene, tetrafluoroethylene, asbestos, etc. In at least one preferred embodiment, membrane 105 is 25 microns thick and comprised of polypropylene.

Other standard features of electrolysis tank 101 are gas outlets 107 and 109. As hydrogen gas is produced at the cathode and oxygen gas is produced at the anode, in the exemplary embodiment shown in FIG. 1 oxygen gas will exit tank 101 through outlet 107 while hydrogen gas will exit through outlet 109. Replenishment of the electrolyte containing water is preferably through a separate conduit, for example conduit 111. In at least one embodiment of the invention, another conduit 113 is used to remove water from the system. If desired, a single conduit can be used for both water removal and replenishment. It will be appreciated that a system utilizing electrolysis system 100 to produce hydrogen will also include means for either storing the produced gases, e.g., hydrogen storage tanks, or means for delivering the produced gas to the point of consumption, e.g., pipes and valves, as well as flow gauges, pressure gauges, gas compressors, gas driers, gas purifiers, water purifiers, water pumps, etc.

The electrolysis system of the invention uses three types of electrodes, each type of electrode being comprised of one or more electrode pairs with each electrode pair including a cathode (i.e., a cathode coupled electrode) and an anode (i.e., an anode coupled electrode). All cathodes, regardless of the type, are kept in one region of tank 101 while all anodes, regardless of the type, are kept in the other tank region, the two tank regions separated by membrane 105. In the embodiment illustrated in FIG. 1, each type of electrode includes a single pair of electrodes.

The first pair of electrodes, electrodes 115/116, and the second set of electrodes, electrodes 117/118, are both low voltage electrodes and, in the illustrated embodiment, coupled to the same voltage source 119. The third set of electrodes, electrodes 121/122, are coupled to a high voltage source 123. As described and illustrated, voltage source 119 is referred to and labeled as a 'low' voltage source not because of the absolute voltage produced by the source, but because the output of voltage source 119 is maintained at a lower output voltage than the output of voltage source 123. Preferably and as shown, the individual electrodes of each pair of electrodes are parallel to one another; i.e., the face of electrode 115 is parallel to the face of electrode 116, the face of electrode 117 is parallel to the face of electrode 118, and the face of electrode 121 is parallel to the face of electrode 122. Additionally, and as shown, in at least one preferred embodiment electrodes 117 and 118 are not positioned directly across from one another, rather they are on opposite sides of electrodes 115 and 116 as shown.

Although electrode pairs 115/116 and 117/118 are both low voltage electrodes and are preferably coupled to the same voltage supply, these electrode pairs are quite different, both in terms of composition and size. In the preferred embodiment electrodes 115/116 are comprised of titanium while electrodes 117/118 are comprised of steel. It should be appreciated, however, that other materials can be used as long as electrodes 115/116 are made up of a different material from electrodes 117/118. In addition to titanium and steel, other exemplary materials that can be used for electrode pairs 115/116 and 117/118 include, but are not limited to, copper, iron, stainless steel, cobalt, manganese, zinc, titanium, platinum, nickel, and alloys of these materials. Preferably the faces of electrodes 115 and 117 are coplanar as are the faces of electrodes 116 and 118. Also preferably, the combined area made up by the faces of electrodes 115 and 117, and similarly the faces of electrodes 116 and 118, cover approximately 70 percent to 90 percent of the cross-sectional area of tank 101. Preferably electrodes 117 and 118 have a much smaller surface area than that of electrodes 115 and 116, for example on the order of a sixth of the area. Also preferably, the height of electrodes 115, 116, 117, and 118 are close to the water level of water 103 within tank 101. Preferably the separation of the plane containing electrodes 115 and 117 and the plane containing electrodes 116 and 118 is between 3 millimeters and 15 centimeters, and more preferably on the order of 10 to 12 centimeters.

Electrodes 121/122 are positioned outside of electrodes 115/116 and 117/118 (i.e., outside of the planes containing electrodes 115/116 and 117/118). In other words, the separation distance between electrodes 121 and 122 is greater than the distance separating the planes containing electrodes 115/116 and 117/118. Additionally the surface area of electrodes is much less than either electrodes 115/116 or electrodes 117/118; for example in one preferred embodiment the area of electrodes 121/122 is approximately 2 to 3 percent the area of electrodes 117/118. Preferably electrodes 121/122 are fabricated from titanium, although other materials can be used (e.g., steel, copper, iron, stainless steel, cobalt, manganese, zinc, titanium, platinum, and alloys of these materials).

As previously noted, the voltage applied to electrode pair 121/122 is greater than that applied to electrodes 115, 116, 117 and 118. Preferably the ratio of the high voltage to the low voltage is between 5:1 and 33:1, and more preferably between 5:1 and 20:1. Typically the high voltage generated by source 123 is within the range of 50 volts to 50 kilovolts, and preferably within the range of 100 volts to 5 kilovolts. Typically the low voltage generated by source 119 is within the range of 3 volts to 1500 volts, and preferably within the range of 12 volts to 750 volts. Rather than continually apply voltage to the electrodes, sources 119 and 123 are pulsed, preferably at a frequency of between 50 Hz and 5 kHz with a pulse width (i.e., pulse duration) of between 10 nanoseconds and 0.5 seconds, and more preferably with a pulse width of between 10 nanoseconds and 0.2 seconds. Additionally, the voltage pulses are applied simultaneously to electrodes 121/122 via source 123 and electrodes 115, 116, 117 and 118 via source 119. In other words, the pulses applied to electrodes 121/122 coincide with the pulses applied to electrodes 115, 116, 117 and 118. The inventor has found that by simultaneously applying a high voltage to outermost electrodes 121/122 and a low (i.e., lower) voltage to electrodes 115, 116, 117 and 118, the production of hydrogen can be greatly increased over a conventional electrolysis system. Although voltage sources 119 and 123 can include internal means for pulsing the respective outputs from each source, preferably an external pulse generator 125 controls a pair of switches, i.e., low voltage switch 127 and high voltage switch 129 which, in turn, control the output of voltage sources 119 and 123 as shown, and as described above.

As previously noted, the electrolysis process of the invention generates considerable heat. It will be appreciated that if the system is allowed to become too hot, the water within the tank will begin to boil. Additionally, other components such as membrane 105 are susceptible to heat damage. Although the system can be turned off and allowed to cool when the temperature exceeds a preset value, this is not a preferred approach due to the inherent inefficiency of stopping the process, allowing the system to cool, and then restarting the system. Accordingly in the preferred embodiments of the invention the system includes means to actively cool the system to within an acceptable temperature range. In at least one preferred embodiment, the cooling system does not allow the temperature to exceed 90° C. Although it will be appreciated that the invention is not limited to a specific type of cooling system or a specific implementation of the cooling system, in at least one embodiment the electrolysis tank is surrounded by a coolant conduit 131, portions of which are shown in FIGS. 1, 2, 7, and 10-15. Within coolant conduit 131 is a heat transfer medium, for example water. The coolant pump and refrigeration system is not shown in the figures as cooling systems are well known by those of skill in the art.

Figure 2:
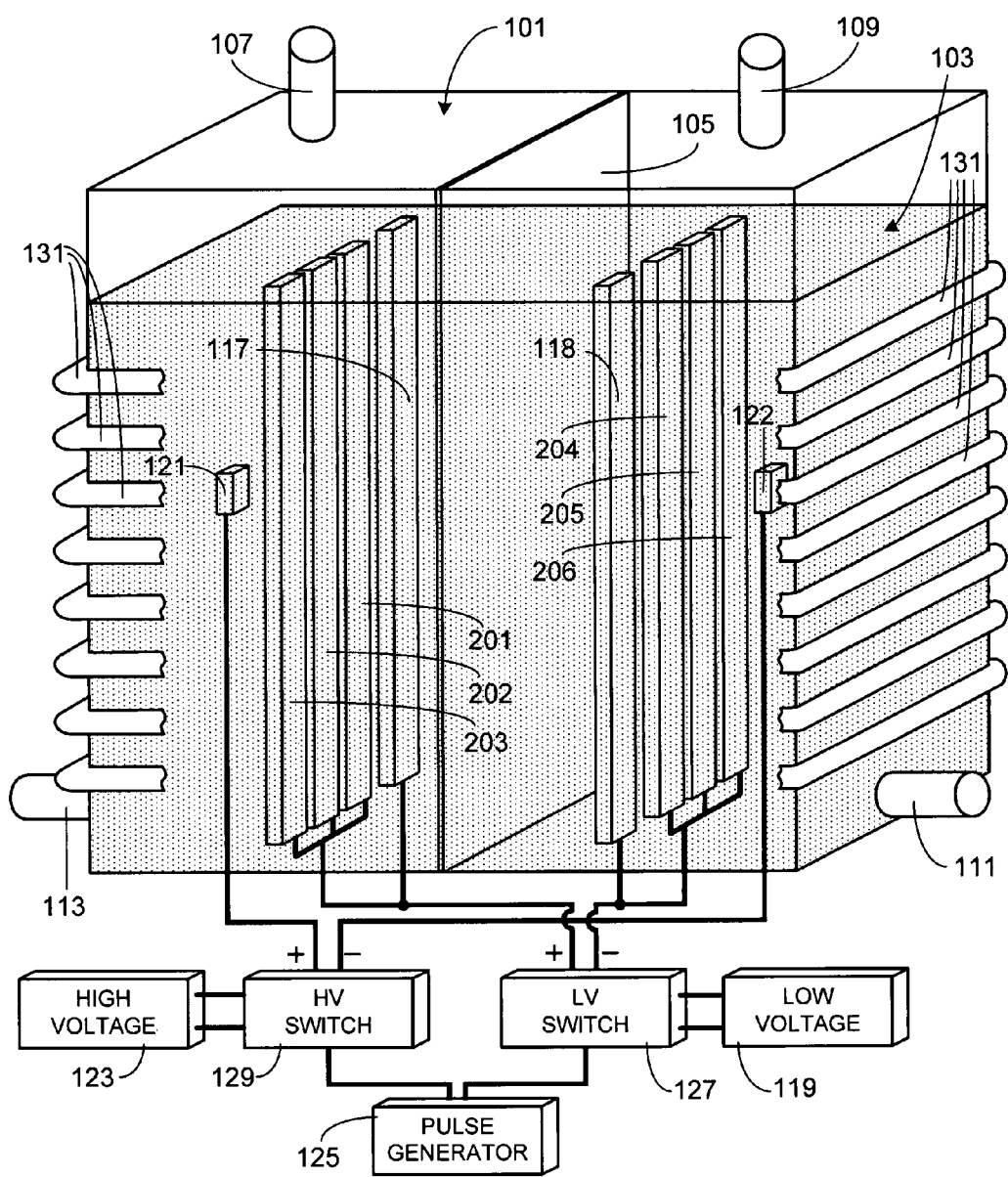
FIG. 2 is an illustration of an alternate preferred embodiment utilizing multiple electrodes for one type of low voltage electrode.

Before describing variations, a specific preferred embodiment will be described. In general this embodiment has the same configuration as that shown in FIG. 1 except, as shown in FIG. 2, electrode 115 is replaced by 3 electrodes 201-203 while electrode 116 is replaced by 3 electrodes 204-206. Electrodes 201-206 were made of rectangular sheets of titanium, each sheet having an area of 5 centimeters by 75 centimeters. Electrodes 117 and 118 were made of rectangular sheets of steel, each having an area of 5 centimeters by 75 centimeters. Electrodes 121 and 123 were made of rectangular sheets of titanium, each sheet having an area of 2 centimeters by 5 centimeters. The plane containing electrodes 201-203 and 117 was separated from the plane containing 204-206 and 118 by 12 centimeters while the separation between electrodes 121 and 122 was 55 centimeters. Tank 101 was filled with 180 liters of water, the water including a potassium hydroxide electrolyte at a concentration of 0.2% by weight.

Figure 3:
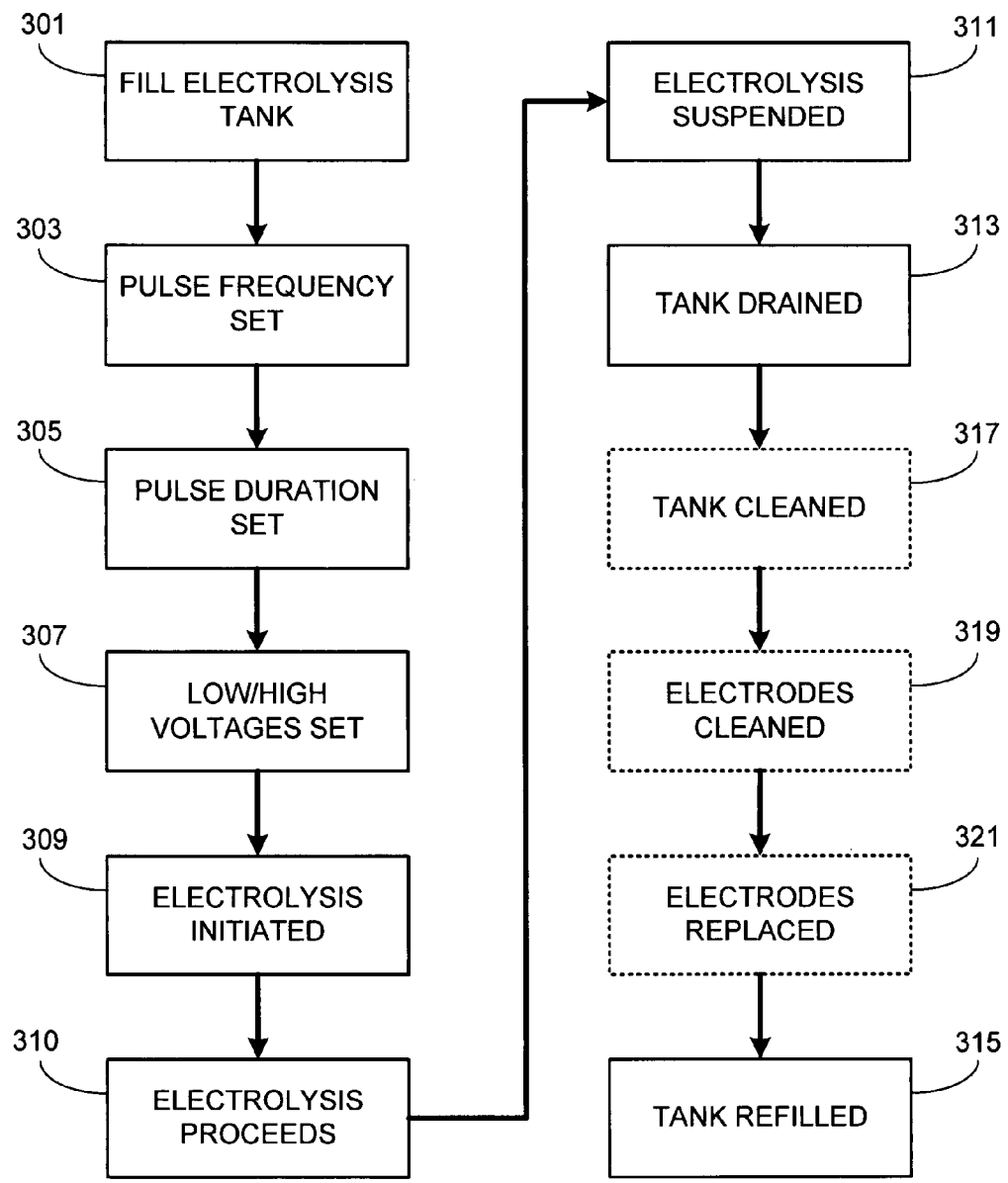
FIG. 3 is an illustration of one mode of operation.

It should be understood that the present invention can be operated in a number of modes, the primary difference between the modes being the degree of process optimization used during operation. For example, FIG. 3 illustrates one method of operation requiring minimal optimization. As illustrated, initially the electrolysis tank, e.g., tank 101, is filled with water (step 301). The level of water in the tank preferably just covers the top of the electrodes although the process can also be run with even more water filling the tank. The electrolyte can either be mixed into the water prior to filling the tank or after the tank is filled. The frequency of the pulse generator is then set (step 303) as well as the pulse duration (step 305), the pulse generator controlling the output pulse frequency/duration for both voltage supplies. The initial voltage settings for the low voltage power supply (e.g., source 119) and the high voltage power supply (e.g., source 123) are also set (step 307). It will be appreciated that the order of set-up is clearly not critical to the electrolysis process. In the preferred approach, prior to the initiation of electrolysis the temperature of the water is at room temperature.

Once set-up is complete, electrolysis is initiated (step 309). During the electrolysis process (step 310), and as previously noted, the water is heated by the process itself. For example, during operation of an exemplary embodiment the water temperature increased from an initial temperature of 25° C. to an average temperature of 70° C., the temperature increase occurring over a period of less than 24 hours. In this exemplary embodiment (i.e., FIG. 2), the pulse frequency was set to 100 Hz, the initial pulse duration was set to 0.5 milliseconds, the low voltage supply was set to 35 volts (drawing approximately 7 amps) and the high voltage supply was set to 210 volts (drawing approximately 1 amp). With this set-up, the system of the invention produced hydrogen at an average rate of 10 to 15 liters per hour. In comparison, a conventional electrolysis system of similar capacity will produce approximately 1 liter of hydrogen per hour.

Eventually, after the rate of hydrogen production drops below a user preset level, the electrolysis process is suspended (step 311) and the water is removed from the tank (step 313). The tank is then refilled (step 315) in order to prepare it for further electrolysis. If desired, prior to refilling the tank, the tank can be washed out (optional step 317). Other optional system preparatory steps include cleaning the electrodes to remove oxides (optional step 319), for example by washing the electrodes with diluted acids, and/or replacing spent (i.e., used up) electrodes as necessary (optional step 321). After cleaning the system and/or replacing electrodes as necessary, and refilling the system, the system is ready to reinitiate the electrolysis process.

The above sequence of processing steps works best once the operational parameters have been optimized for a specific system configuration since the system configuration will impact the efficiency of the process and therefore the hydrogen output. Exemplary system configuration parameters that affect the optimal electrolysis settings include tank size, quantity of water, electrolyte composition, electrolyte concentration, electrode size, electrode composition, electrode shape, electrode configuration, electrode separation, initial water temperature, low voltage setting, high voltage setting, pulse frequency and pulse duration.

Figure 4:
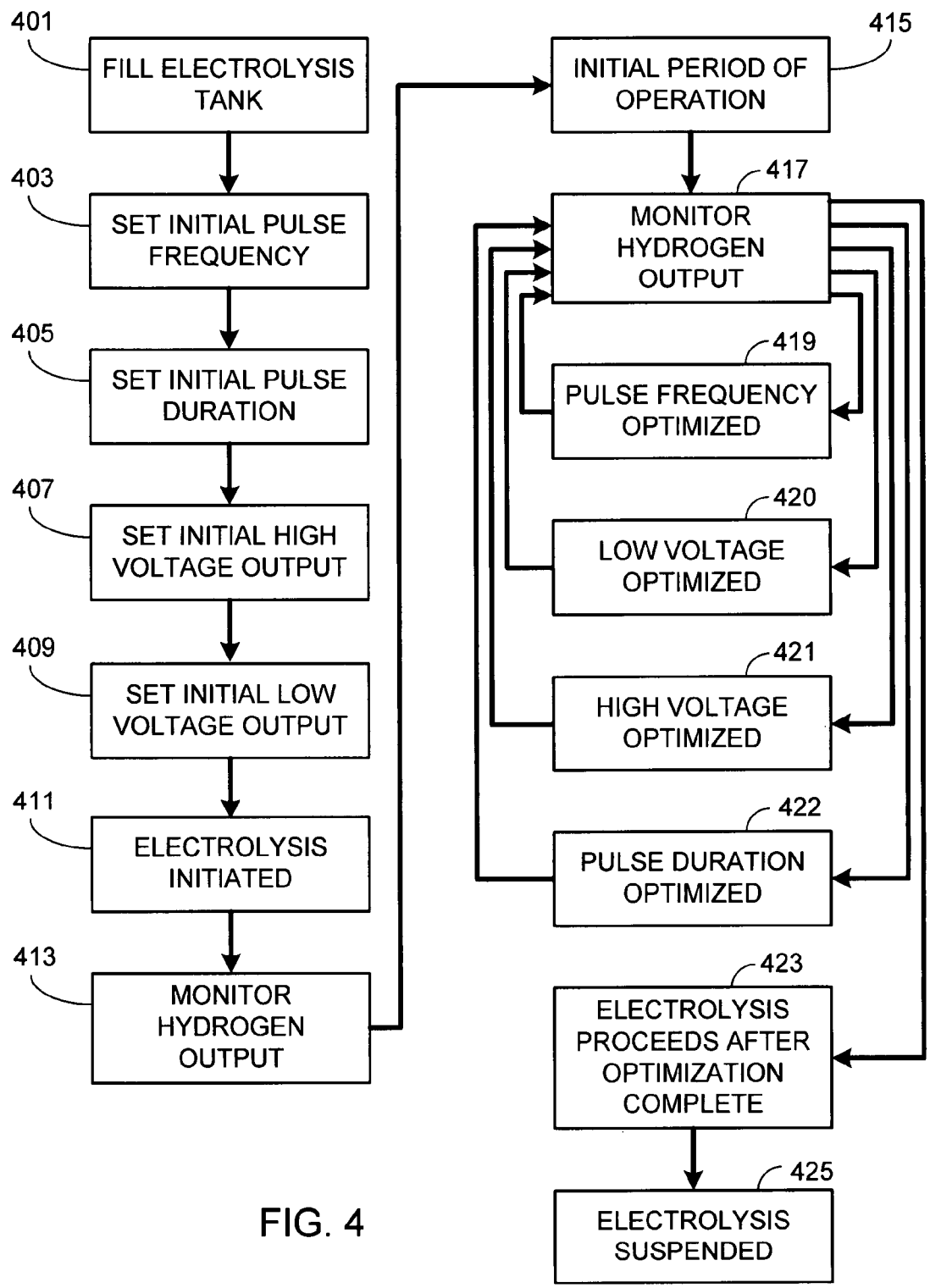
FIG. 4 is an illustration of an alternate mode of operation that includes initial process optimization steps.

FIG. 4 illustrates an alternate procedure, one in which the process undergoes optimization. Initially the tank is filled (step 401) and initial settings for pulse frequency (step 403), pulse duration (step 405), high voltage supply output (step 407) and low voltage supply output (step 409) are made. Typically the initial settings are based on previous settings that have been optimized for a similarly configured system. For example, assuming that the new configuration was the same as a previous configuration except for the composition of the electrodes, a reasonable initial set-up would be the optimized set-up from the previous configuration.

After the initial set-up is completed, electrolysis is initiated (step 411) and the hydrogen output flow rate is monitored (step 413). Although system optimization can begin immediately, preferably the system is allowed to run for an initial period of time (step 415) prior to optimization. The initial period of operation can be based on achieving a predetermined level of hydrogen flow, for example 50 liters per hour, or achieving a steady state hydrogen flow rate. Alternately the initial period of time can simply be a predetermined time period, for example 6 hours.

After the initial time period is exceeded, the hydrogen output is monitored (step 417) while optimizing one or more of the operational parameters. Although the order of parameter optimization is not critical, in at least one preferred embodiment the first parameter to be optimized is pulse frequency (step 419). Then the voltage of the low voltage supply is optimized (step 420) followed by the optimization of the output voltage of the high voltage supply (step 421). Lastly the pulse duration is optimized (step 422). In this embodiment after optimization is complete, based on hydrogen output, the electrolysis process is allowed to continue (step 423) without further optimization until the process is halted, step 425, for example due to the rate of hydrogen production dropping below a user preset level. In another, and preferred, alternative approach illustrated in FIG. 5, optimization steps 419-422 are performed continuously throughout the electrolysis process until electrolysis is suspended.

Figure 5:
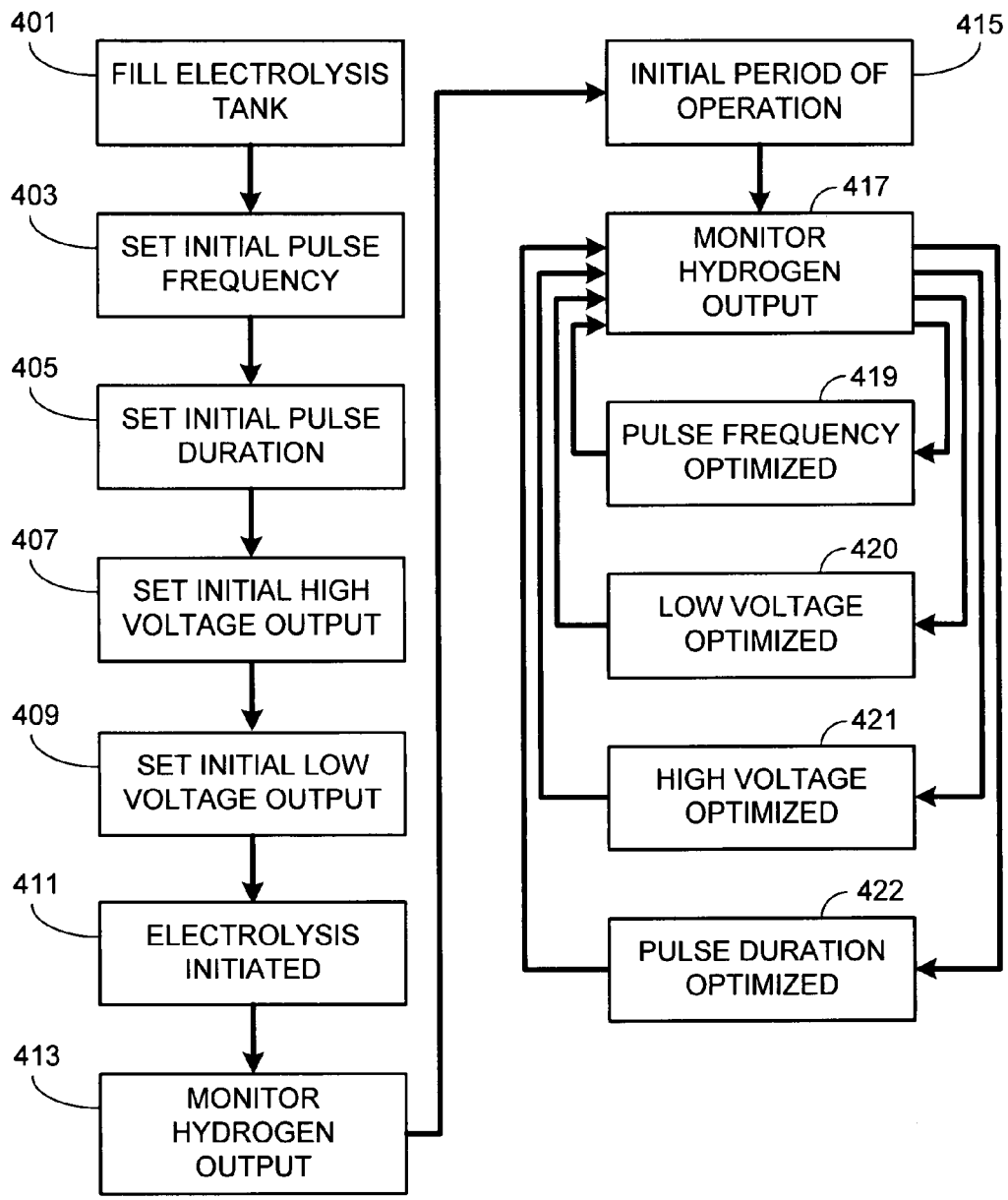
FIG. 5 is an illustration of an alternate, and preferred, mode of operation in which the process undergoes continuous optimization.
Figure 6:
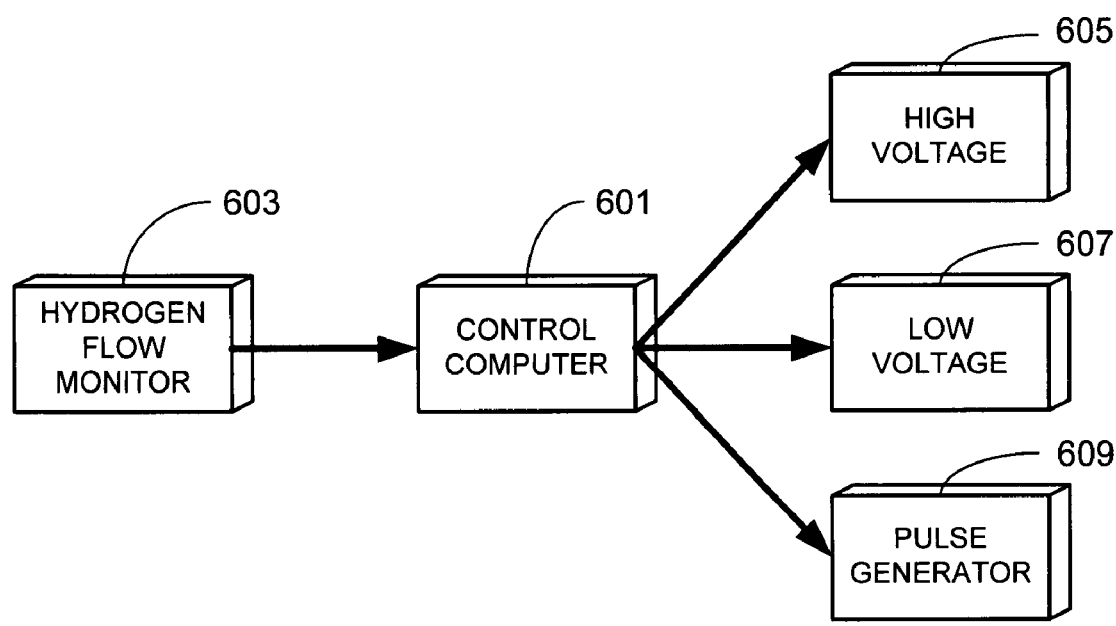
FIG. 6 is a block diagram illustrating the preferred optimization control system.

The optimization process described relative to FIGS. 4 and 5 can be performed manually. In the preferred embodiment, however, the system and the optimization of the system are controlled via computer as illustrated in the block diagram of FIG. 6. As shown, computer 601 receives hydrogen flow rate data from monitor 603. Using this information computer 601 varies the output of high voltage source 605, the output of low voltage source 607 and the frequency and pulse duration generated by pulse generator 609 in order to optimize the output of the system as previously described.

Figure 7:
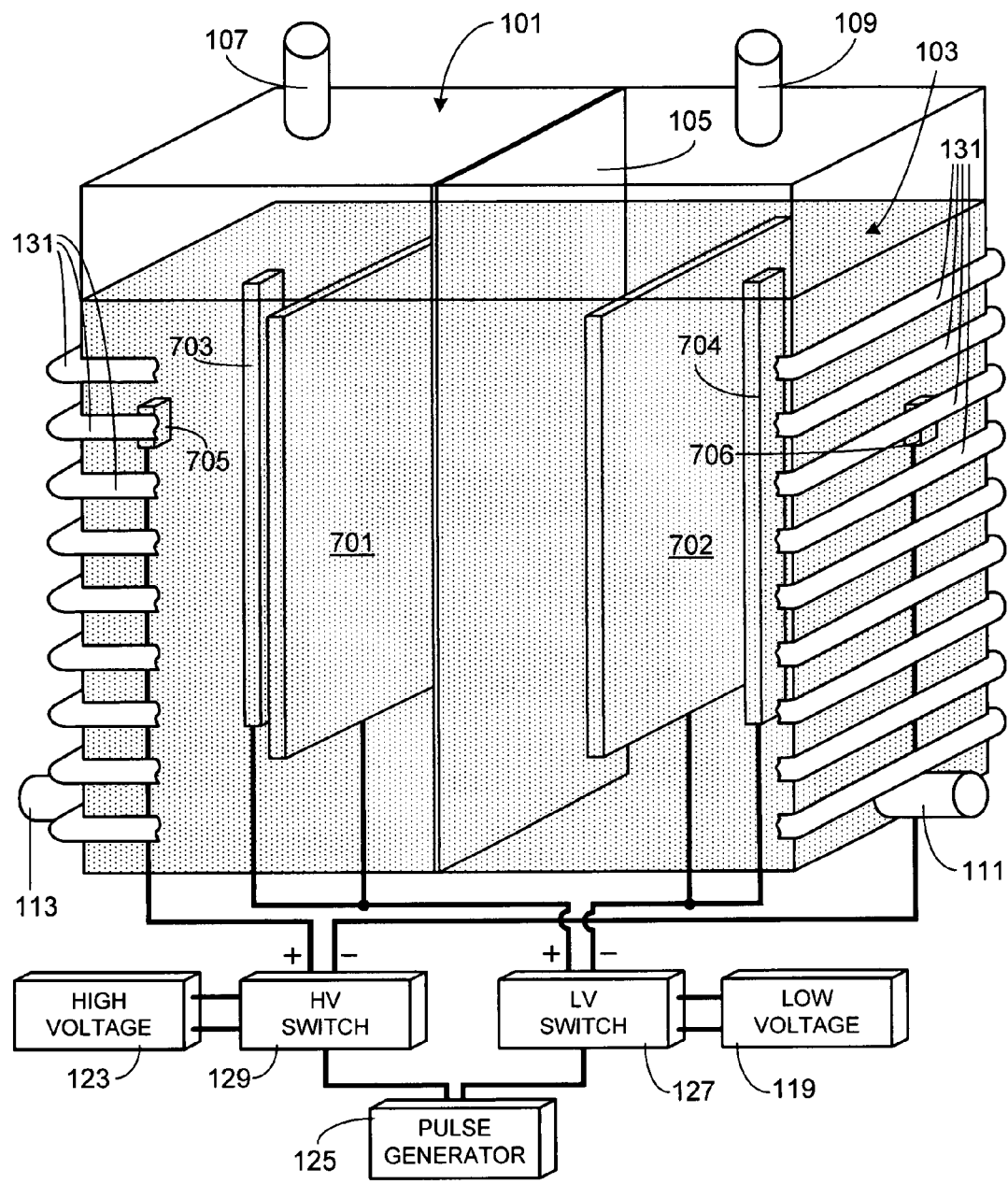
FIG. 7 is an illustration of an alternate embodiment in which the separation distance between one type of low voltage electrode is greater than the separation distance between the second type of low voltage electrode.

Although preferably the two types of electrodes connected to the low voltage power supply are arranged in a coplanar fashion as illustrated in FIGS. 1 and 2 (e.g., 115/116 and 117/118 in FIG. 1 and electrodes 117/201-203 and 118/204-205 in FIG. 2), it will be appreciated that such arrangement is not a requirement of the invention. For example and as illustrated in FIG. 7, the first type of low voltage electrodes (i.e., electrodes 701/702 which correspond to exemplary electrodes 115/116 of FIG. 1) is separated by a smaller distance than the second type of low voltage electrodes (i.e., electrodes 703/704 which correspond to exemplary electrodes 117/118 of FIG. 1). Thus, as shown, the two types of low voltage electrodes are not coplanar. As in the previous embodiments, the high voltage electrodes 705/706 are positioned outside the planes of the low voltage electrodes.

Figure 8:
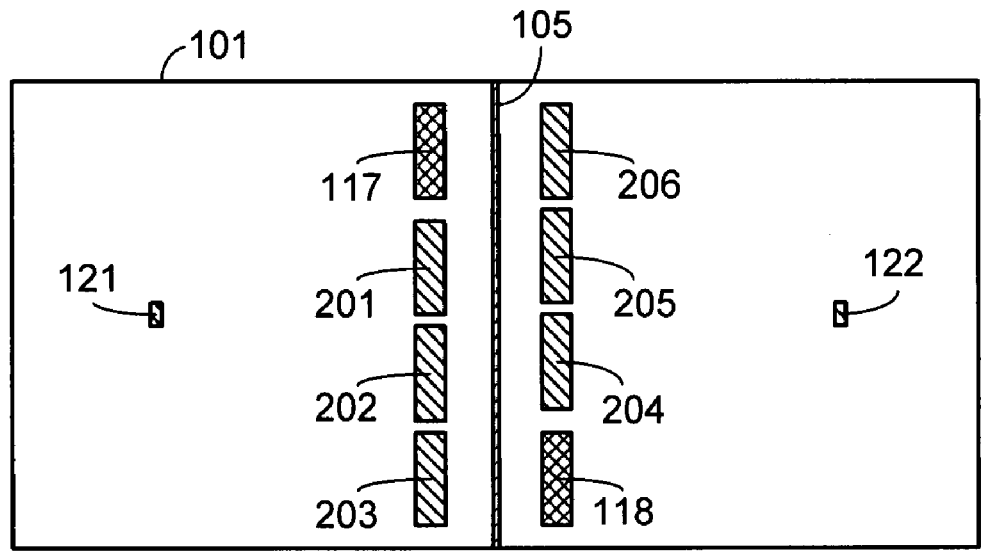
FIG. 8 is a top, cross-sectional view of the embodiment shown in FIG. 2.
Figure 9:
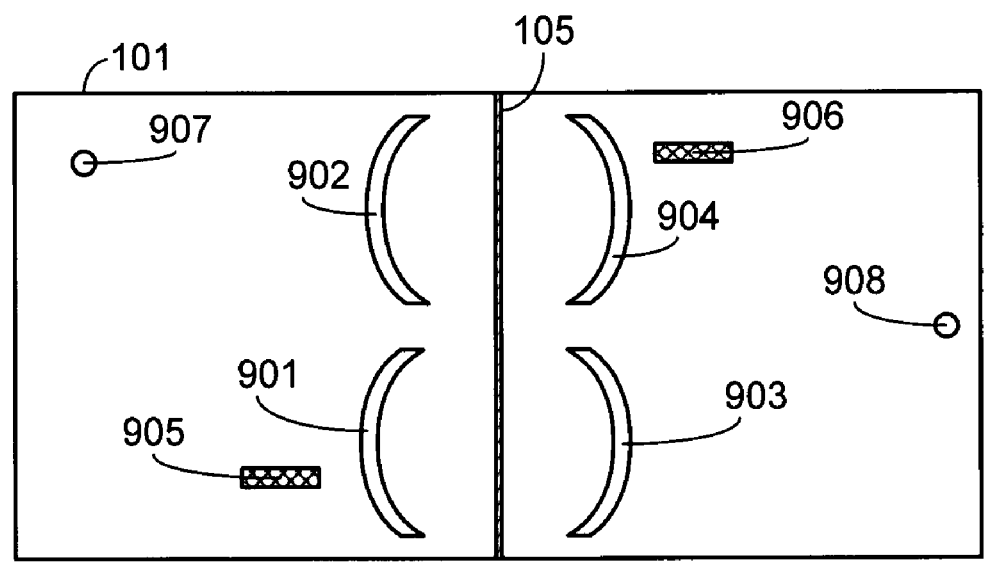
FIG. 9 is a top, cross-sectional view of an alternate embodiment utilizing shaped electrodes for one type of low voltage electrode.

As previously described, preferably the electrodes are flat and arranged such that the flat electrodes faces are parallel to one another. For example, another view of the system shown in FIG. 2 is provided in FIG. 8, the latter view being a top, cross-sectional view of the electrode configuration. It should be appreciated that such a configuration is not a requirement of the invention. For example, some or all of the electrodes can utilize curved surfaces and/or be arranged in a non-parallel geometry. Examples of some variations are shown in the top, cross-sectional view of FIG. 9. In this exemplary embodiment one type of low voltage electrode, corresponding to electrodes 115/116 of FIG. 1, have curved electrode faces (i.e., electrodes 901-904) while the second type of low voltage electrode, corresponding to electrodes 117/118 of FIG. 1, have flat faces that are perpendicular to the membrane and positioned near the walls of the tank (i.e., electrodes 905/906). The third type of electrodes, the high voltage electrodes corresponding to electrodes 121/122 of FIG. 1, are cylindrically shaped and positioned near the outermost walls of the tank and outside of the two types of low voltage electrodes (i.e., electrodes 907/908).

Figure 10:
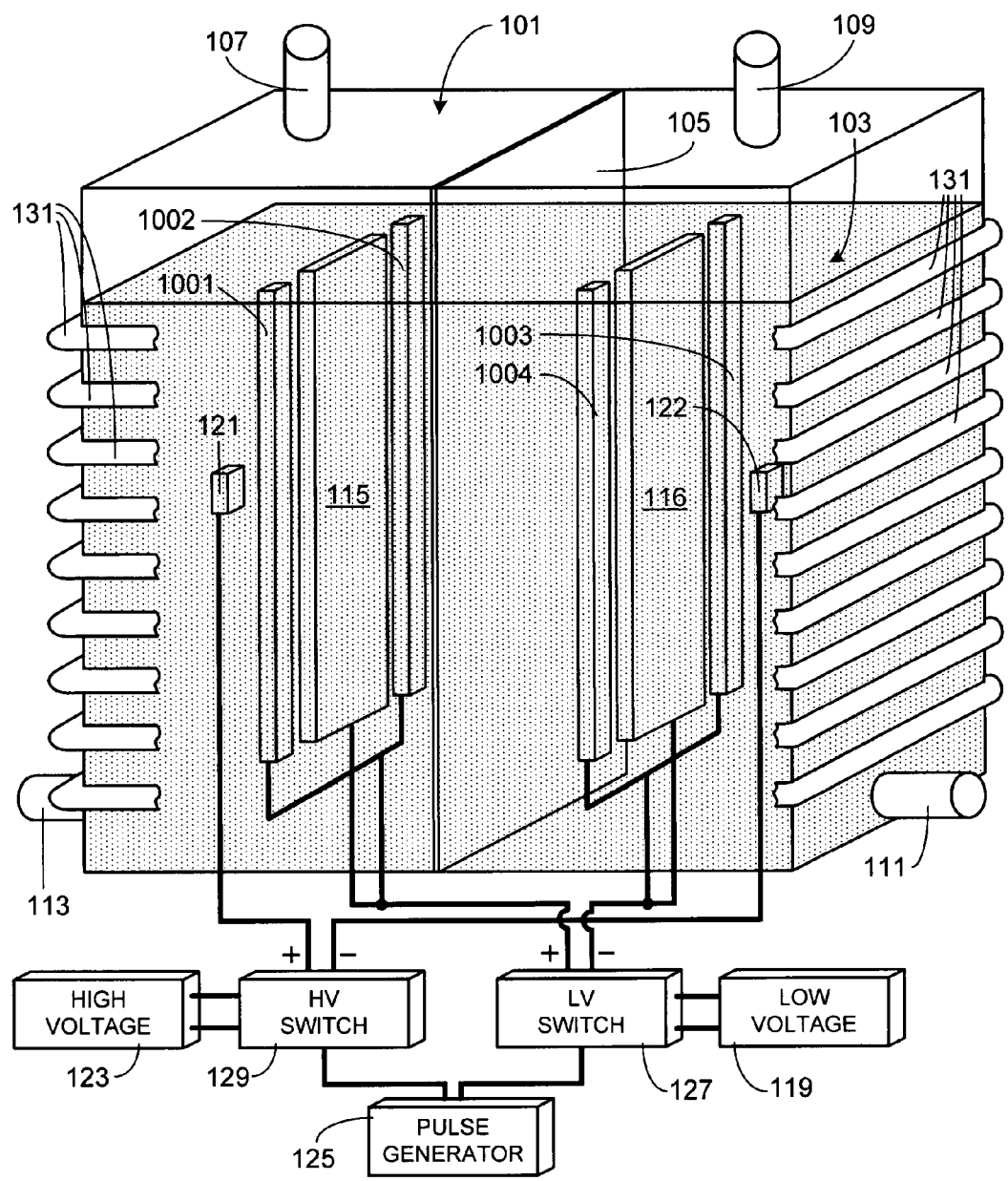
FIG. 10 is an illustration of an alternate embodiment utilizing multiple electrodes for the second type of low voltage electrode.

As previously described, FIG. 2 illustrates an alternate embodiment of the system shown in FIG. 1 utilizing three electrodes 201-203 of the type represented by electrode 115 in FIG. 1, and three electrodes 204-206 of the type represented by electrode 116 in FIG. 1. In another alternate embodiment of the system shown in FIG. 1, and as shown in FIG. 10, electrode 117 is replaced by two electrodes 1001 and 1002 while electrode 118 is replaced by two electrodes 1003 and 1004.

Figure 11:
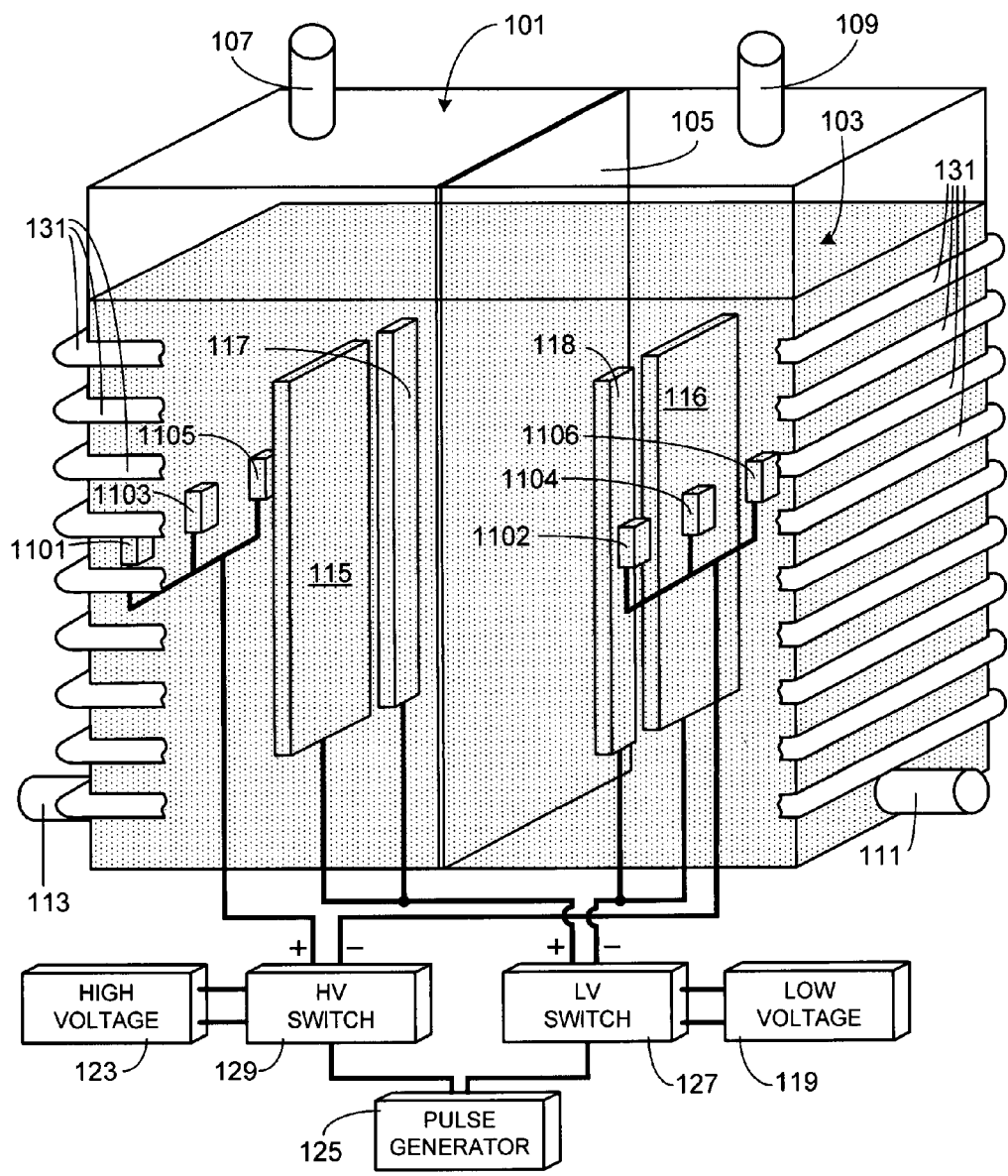
FIG. 11 is an illustration of an alternate embodiment utilizing multiple high voltage electrodes.

In yet another alternate embodiment, shown in FIG. 11, the system includes multiple high voltage electrode pairs (101/1102, 1103/1104, and 1105/1106).

Figure 12:
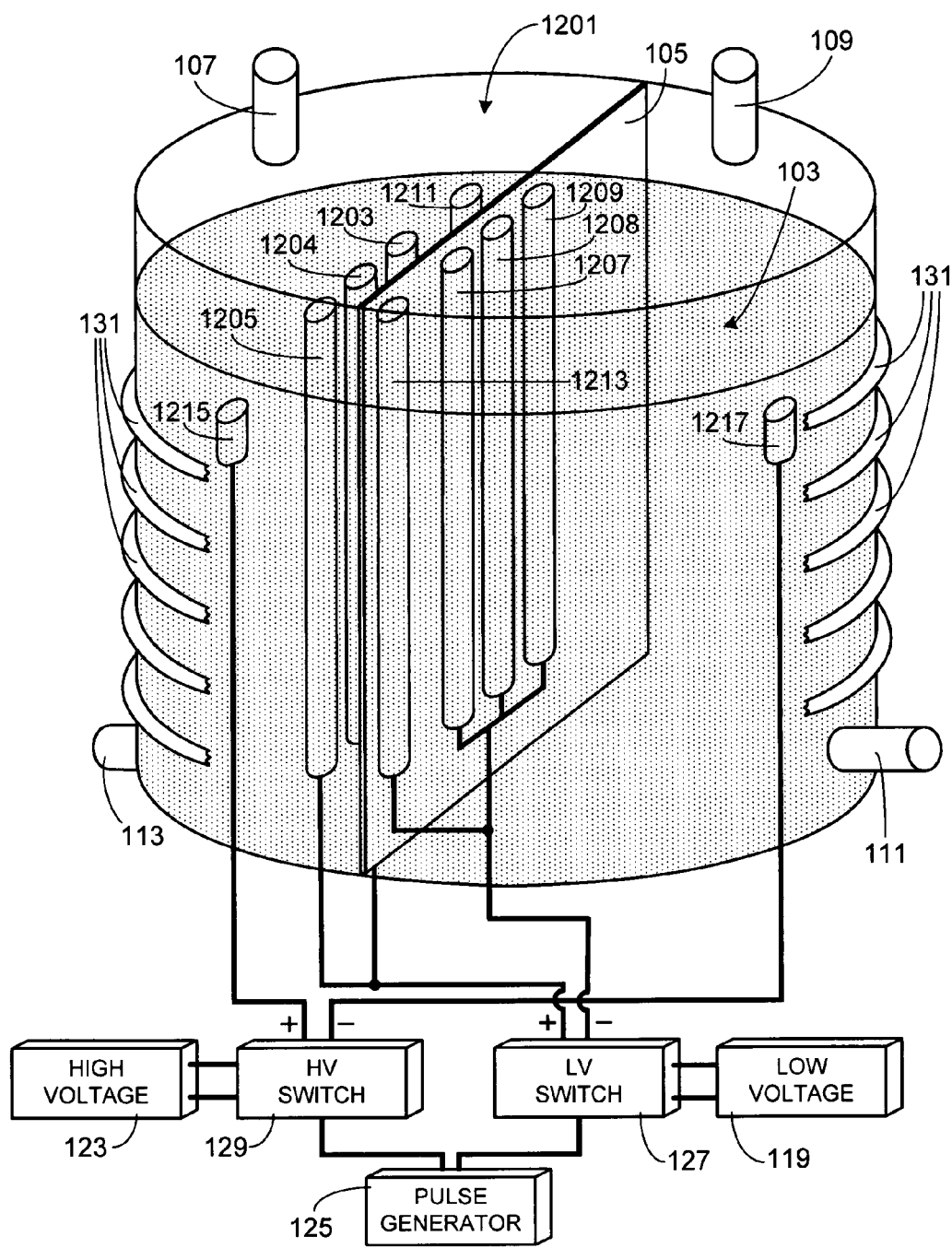
FIG. 12 is an illustration of an alternate embodiment utilizing a cylindrically-shaped tank.

As previously noted, the present invention is not limited to a specific tank shape. FIG. 12 illustrates an embodiment similar to that shown in FIG. 2 utilizing an alternate tank shape, specifically a horizontally-positioned, cylindrically-shaped tank 1201. Although a cylindrical tank does not restrict the type of electrode, in the illustrated embodiment electrodes 201-203 have been replaced with cylindrically-shaped electrodes 1203-1205; electrodes 204-206 have been replaced with cylindrically-shaped electrodes 1207-1209; electrode 117 has been replaced with cylindrically-shaped electrode 1211; electrode 118 has been replaced with cylindrically-shaped electrode 1213; electrode 121 has been replaced with cylindrical electrode 1215; and electrode 122 has been replaced with cylindrically-shaped electrode 1217.

Figure 13:
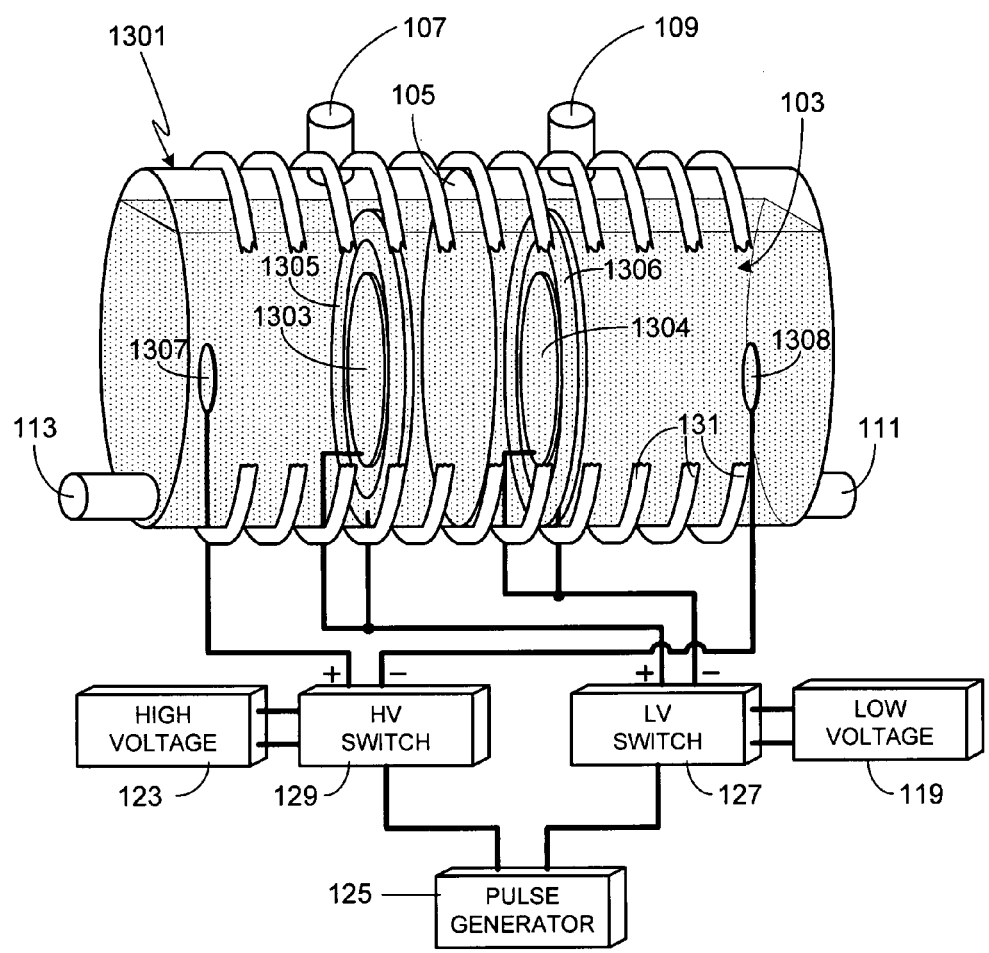
FIG. 13 is an illustration of an alternate embodiment utilizing a cylindrically-shaped tank with a different orientation than the tank of FIG. 12.

In yet another alternate embodiment, the system illustrated in FIG. 13 utilizes a cylindrically-shaped tank 1301 similar to that shown in FIG. 12, except for the orientation of the tank. As in the embodiment illustrated in FIG. 1, this embodiment includes a single pair of electrodes of each type; disc-shaped electrodes 1303/1304 substituting for electrodes 115/116, ring-shaped electrodes 1305/1306 substituting for electrodes 117/118, and disc-shaped electrodes 1307/1308 substituting for electrodes 121/122. As previously noted with respect to the invention in general, the invention is not limited to specific electrode numbers, shapes, sizes or orientations.

Figure 14:
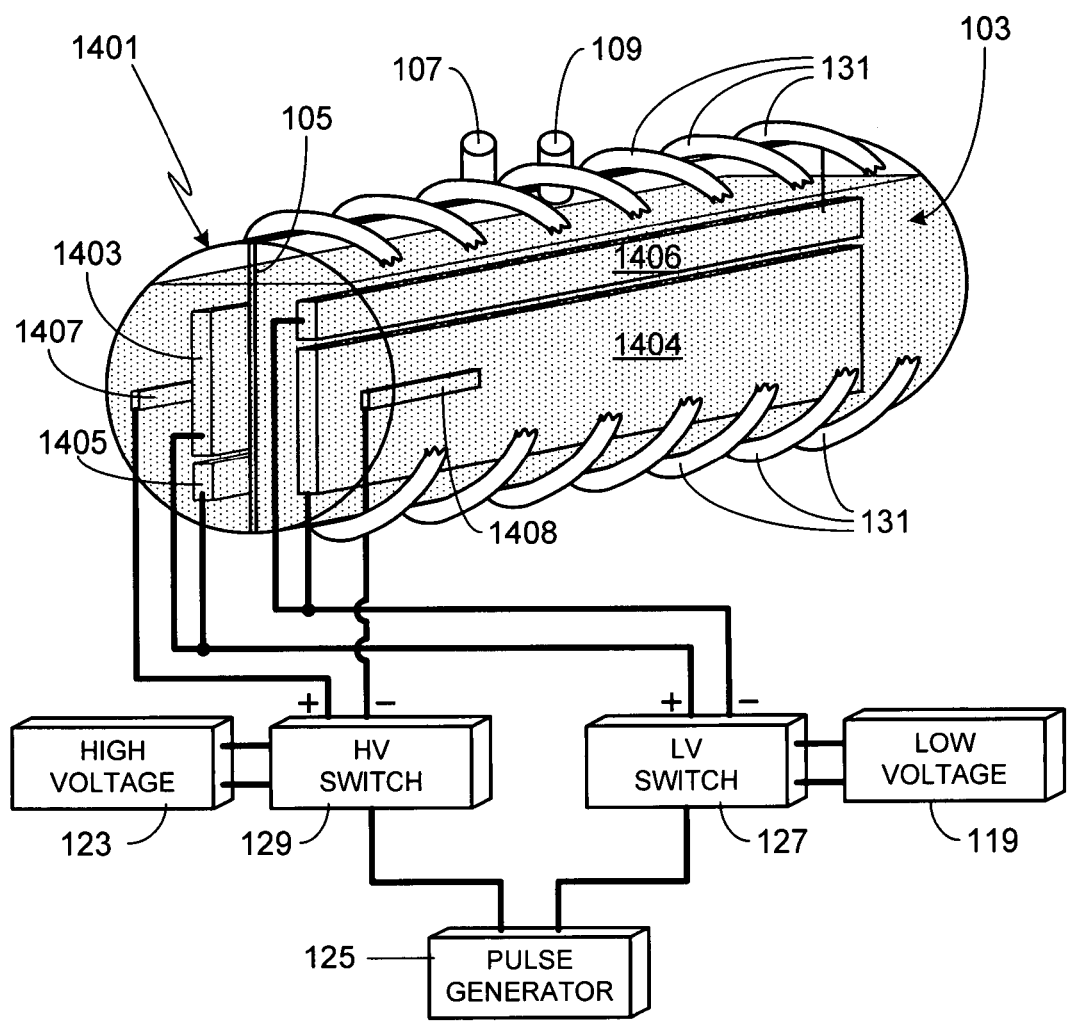
FIG. 14 is an illustration of an alternate embodiment utilizing a cylindrically-shaped tank with a different membrane orientation than that utilized in the tank shown in FIG. 13.

In yet another alternate embodiment, the system illustrated in FIG. 14 utilizes a cylindrically-shaped tank 1401 similar to that shown in FIG. 13, except for the orientation of the membrane and electrodes. As in the embodiment illustrated in FIG. 1, this embodiment includes a single pair of electrodes of each type; electrodes 1403/1404 substituting for electrodes 115/116, electrodes 1405/1406 substituting for electrodes 117/118, and electrodes 1407/1408 substituting for electrodes 121/122. As previously noted with respect to the invention in general, the invention is not limited to specific electrode numbers, shapes, sizes or orientations. It should also be noted that typically electrodes 1407/1408 are centered length-wise within tank 1401; however, the electrodes are shown non-centered in FIG. 14 so that they are visible in this view, i.e., so that electrode 1407 is not hidden from view by electrode 1403 and membrane 105.

Figure 15:
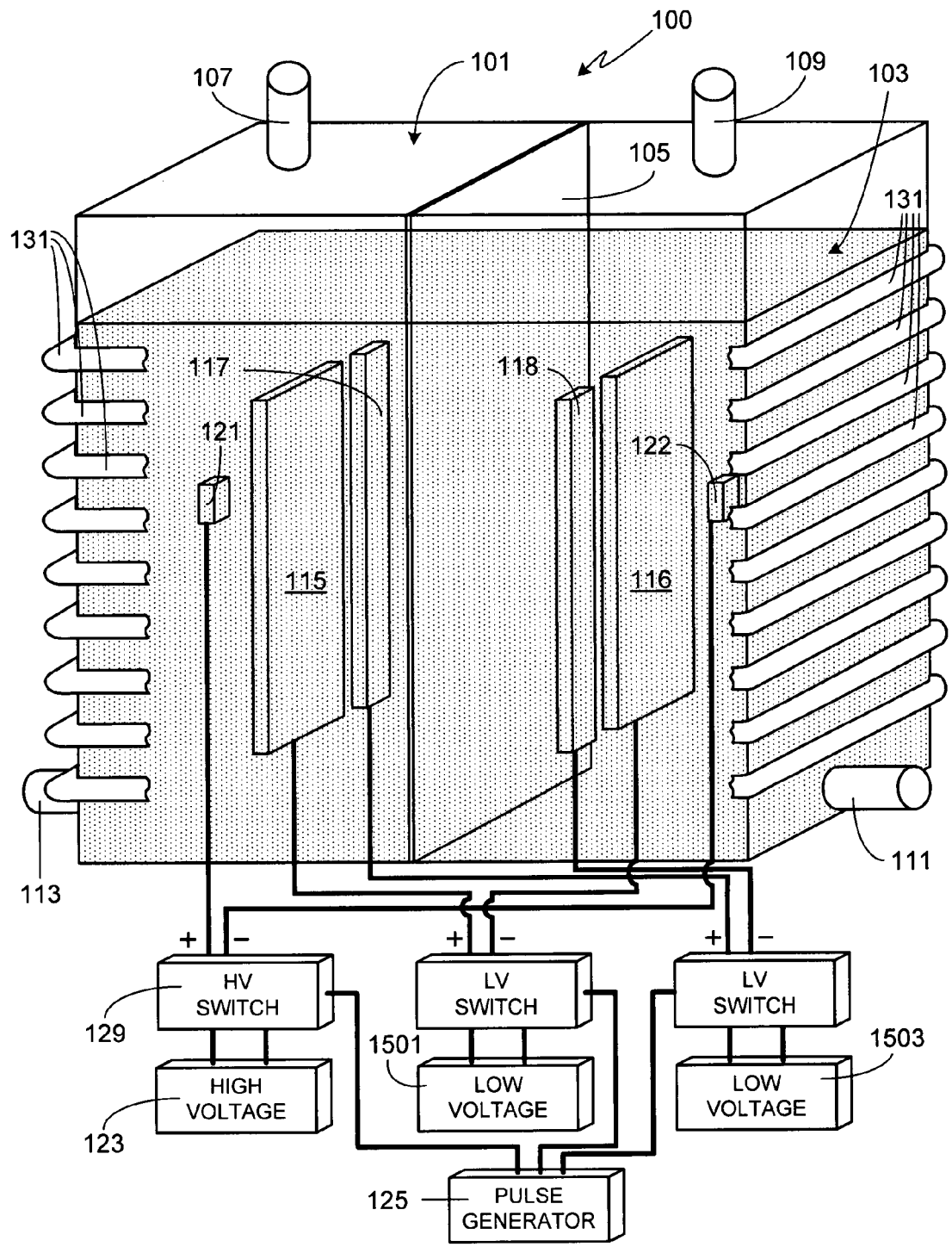
FIG. 15 is an illustration of an alternate embodiment utilizing multiple low voltage power supplies.

It will be appreciated that although all of the illustrated embodiments show only a single low voltage source coupled to both types of low voltage electrodes, two separate low voltage sources 1501 and 1503 can be used as shown in FIG. 15. Although this configuration is similar to that shown in FIG. 1 except for the use of multiple low voltage sources, it will be understood that multiple low voltage sources can be used with any of the illustrated embodiments. The constraints placed on both low voltage source 1501 and low voltage source 1503 are the same as placed on low voltage source 119 of the previous embodiments, for example the preferred ratio of the high voltage to the low voltage (of both low voltage sources) is between 5:1 and 33:1, and more preferably between 5:1 and 20:1. Similarly, it should be understood that the invention can utilize multiple high voltage sources. For example, in the embodiment illustrated in FIG. 11 in which multiple high voltage electrodes are used, multiple high voltage sources could be coupled to these electrodes.

Figure 16:
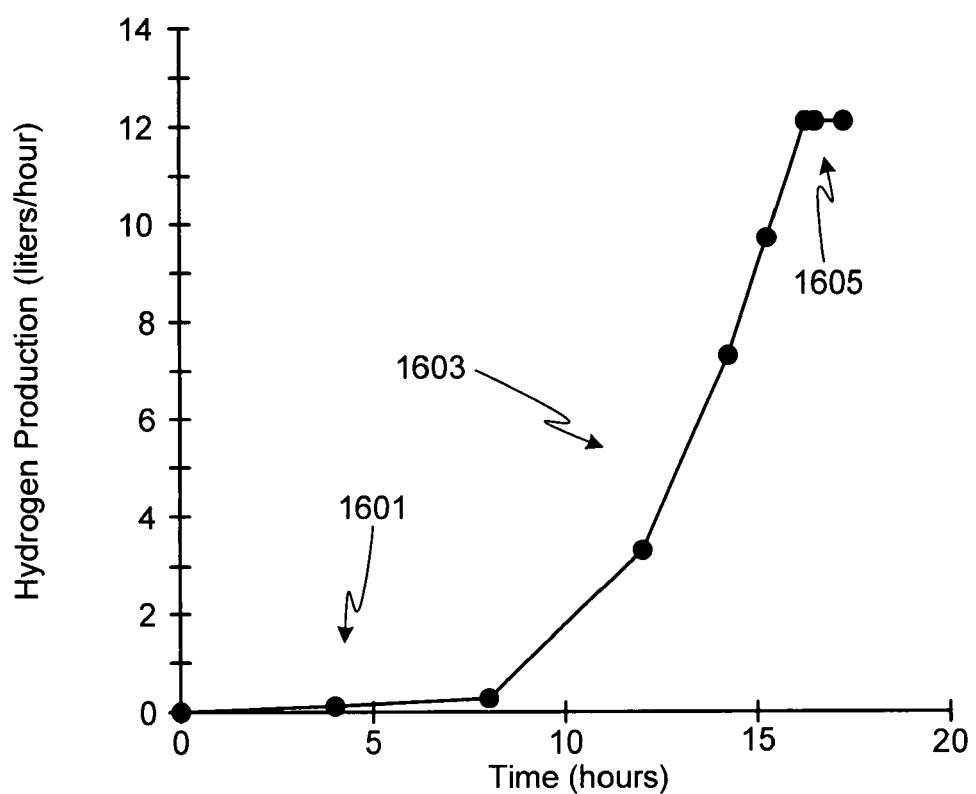
FIG. 16 is an illustration of the hydrogen flow rate for a system such as that shown in FIG. 2.

As previously noted, the use of high voltage electrodes in conjunction with two types of low voltage electrodes (i.e., electrodes of different composition), leads to a major increase in hydrogen production. For example, FIG. 16 illustrates the hydrogen flow rate for a system similar to that shown in FIG. 2. As shown, during the initial period of time, typically on the order of the first 5 to 8 hours of operation, the hydrogen flow rate is similar to that of a conventional system (i.e., region 1601). After this initial period of time, however, the rate undergoes a dramatic increase (i.e., region 1603) until the hydrogen flow rate reaches a plateau (i.e., region 1605) for that particular system. Operation at the higher flow rate will continue until, eventually, it becomes necessary to replace the water in order to maintain the desired hydrogen flow rate/conversion efficiency.

Figure 17:
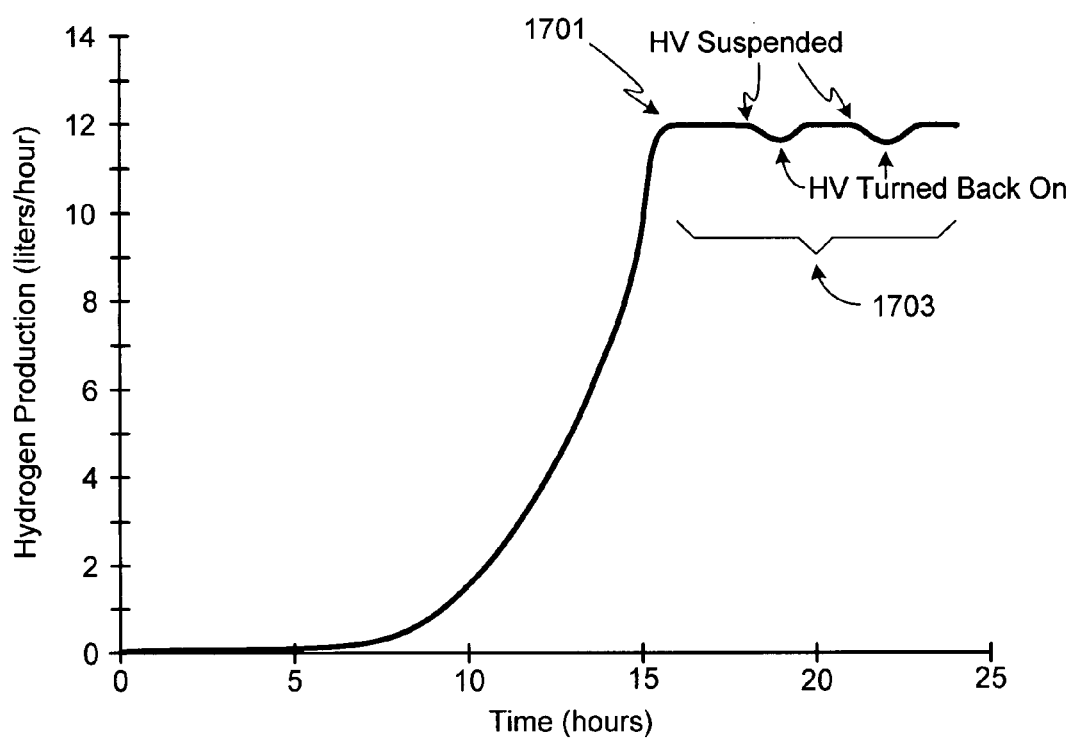
FIG. 17 is an illustration of the hydrogen flow rate for a system in which power to the high voltage electrodes is cycled on/off after maximum flow rate has been achieved.

In order to conserve input energy, the inventor has found that once the high flow plateau has been reached (e.g., region 1605 in FIG. 16), this output level, or close to this output level, will continue for a period of time after power to the high voltage electrodes has been terminated. However, if voltage is re-applied to the high voltage electrodes before the output flow is allowed to significantly decrease, the output flow rate quickly rises back to the previous maximum. Accordingly the high voltage can be cycled on and off to achieve a high output rate while minimizing input power. FIG. 17 is an illustrative flow rate for such a system. As shown, after the maximum flow rate for the system is reached (i.e., region 1701), the high voltage electrodes are cycled on and off (i.e., region 1703). In the illustrated example, the high voltage is applied for 2 hours, then suspended for 1 hour, then applied for 2 hours, etc., this process continuing until the water must be replaced in order to maintain the desired hydrogen flow rate/conversion efficiency. Note that in a preferred implementation of this aspect of the invention, high voltage cycling is based on hydrogen output, not a strict time line. Thus, for example, once voltage to the high voltage electrodes has been suspended, it would not be re-applied until the output flow drops below a user preset level, for example when the flow rate drops by 5 percent of the maximum flow rate. At that time high voltage would be re-applied to the high voltage electrodes until the output flow rate re-stabilizes at the higher flow rate. Cycling would then continue using hydrogen flow rate to determine when to turn-on/turn-off the high voltage electrodes.

As will be understood by those familiar with the art, the present invention may be embodied in other specific forms without departing from the spirit or essential characteristics thereof. For example, although the preferred use of the apparatus is as a hydrogen generator, the system can also be used as a heat source since the apparatus generates considerable heat during use. Accordingly, the disclosures and descriptions herein are intended to be illustrative, but not limiting, of the scope of the invention which is set forth in the following claims.

What is claimed is:
1. An electrolysis system comprising:
   an electrolysis tank;
   a membrane separating said electrolysis tank into a first region and a second region, wherein said membrane permits ion and electron exchange between said first and second regions, and wherein said membrane restricts hydrogen gas flow and oxygen gas flow between said first and second regions;

at least one pair of low voltage electrodes of a first type contained within said electrolysis tank, said at least one pair of low voltage electrodes of said first type comprised of a first material, wherein each pair of said at least one pair of low voltage electrodes of said first type includes an anode and a cathode;

at least one pair of low voltage electrodes of a second type contained within said electrolysis tank, said at least one pair of low voltage electrodes of said second type comprised of a second material, wherein said first and second materials are different, and wherein each pair of said at least one pair of low voltage electrodes of said second type includes an anode and a cathode;

at least one pair of high voltage electrodes contained within said electrolysis tank, wherein each pair of said at least one pair of high voltage electrodes includes an anode and a cathode, wherein said anodes of said first and second types of low voltage electrodes and said anodes of said high voltage electrodes are contained within said first region and said cathodes of said first and second types of low voltage electrodes and said cathodes of said high voltage electrodes are contained within said second region, wherein a first separation distance corresponding to the distance between the high voltage electrodes of each pair of said at least one pair of high voltage electrodes is greater than a second separation distance corresponding to the distance between the low voltage electrodes of each pair of said at least one pair of low voltage electrodes of said first type, and wherein said first separation distance is greater than a third separation distance corresponding to the distance between the low voltage electrodes of each pair of said at least one pair of low voltage electrodes of said second type;

a low voltage source with a first output voltage electrically connected to said at least one pair of low voltage electrodes of said first type and to said at least one pair of low voltage electrodes of said second type;

a high voltage source with a second output voltage electrically connected to said at least one pair of high voltage electrodes, wherein said second output voltage is higher than said first output voltage; and means for simultaneously pulsing both said low voltage source and said high voltage source at a specific frequency and a specific pulse duration.

2. The electrolysis system of claim 1, further comprising means for cooling said electrolysis system.

3. The electrolysis system of claim 2, wherein said cooling means is comprised of a conduit containing a heat transfer medium, wherein a portion of said conduit is in thermal communication with at least a portion of said electrolysis tank.

4. The electrolysis system of claim 3, wherein said heat transfer medium is comprised of water.

5. The electrolysis system of claim 1, wherein said simultaneous pulsing means comprises a pulse generator coupled to said low voltage source and to said high voltage source.

6. The electrolysis system of claim 1, wherein said simultaneous pulsing means comprises a pulse generator coupled to a low voltage switch and coupled to a high voltage switch, wherein said low voltage switch is coupled to said low voltage source, and wherein said high voltage switch is coupled to said high voltage source.

7. The electrolysis system of claim 1, wherein said simultaneous pulsing means comprises a first internal pulse generator coupled to said low voltage source and a second internal pulse generator coupled to said high voltage source.

8. The electrolysis system of claim 1, wherein said membrane is comprised of polypropylene.

9. The electrolysis system of claim 1, wherein a ratio of said second output voltage to said first output voltage is at least 5 to 1.

10. The electrolysis system of claim 1, wherein a ratio of said second output voltage to said first output voltage is within the range of 5:1 to 20:1.

11. The electrolysis system of claim 1, further comprising water within said electrolysis tank, said water including between 0.05 and 0.5 percent by weight of an electrolyte.

12. The electrolysis system of claim 11, wherein said electrolyte is comprised of potassium hydroxide.

13. The electrolysis system of claim 1, wherein said first output voltage is between 3 volts and 1500 volts and said second output voltage is between 50 volts and 50 kilovolts.

14. The electrolysis system of claim 1, wherein said first output voltage is between 12 volts and 750 volts and said second output voltage is between 100 volts and 5 kilovolts.

15. The electrolysis system of claim 1, wherein a ratio of a first surface area corresponding to each low voltage electrode of said first type and a second surface area corresponding to each low voltage electrode of said second type is greater than 6 to 1.

16. The electrolysis system of claim 1, wherein a first surface area corresponding to each high voltage electrode is less than three percent of a second surface area corresponding to each low voltage electrode of said first type.

17. The electrolysis system of claim 1, wherein said first material is selected from the group consisting of steel, nickel, copper, iron, stainless steel, cobalt, manganese, zinc, titanium, platinum, and alloys of steel, nickel, copper, iron, stainless steel, cobalt, manganese, zinc, titanium, and platinum, wherein said second material is selected from the group consisting of steel, nickel, copper, iron, stainless steel, cobalt, manganese, zinc, titanium, platinum, and alloys of steel, nickel, copper, iron, stainless steel, cobalt, manganese, zinc, titanium, and platinum, and wherein each high voltage electrode is comprised of a material selected from the group consisting of steel, nickel, copper, iron, stainless steel, cobalt, manganese, zinc, titanium, platinum, and alloys of steel, nickel, copper, iron, stainless steel, cobalt, manganese, zinc, titanium, and platinum.

18. The electrolysis system of claim 1, wherein said second separation distance between the low voltage electrodes of each pair of said at least one pair of low voltage electrodes of said first type is between 3 millimeters and 15 centimeters.

19. The electrolysis system of claim 1, wherein said third separation distance between the low voltage electrodes of each pair of said at least one pair of low voltage electrodes of said second type is between 3 millimeters and 15 centimeters.

20. The electrolysis system of claim 1, wherein all low voltage electrodes of said first type and all low voltage electrodes of said second type are positioned between said high voltage electrodes of said at least one pair of high voltage electrodes.

21. The electrolysis system of claim 1, wherein all low voltage cathode electrodes of said first type and all low voltage cathode electrodes of said second type are positioned in a first plane, and wherein all low voltage anode electrodes of said first type and all low voltage anode electrodes of said second type are positioned in a second plane.

22. The electrolysis system of claim 1, wherein each low voltage electrode of said at least one pair of low voltage electrodes of said first type is flat.

23. The electrolysis system of claim 1, wherein each low voltage electrode of said at least one pair of low voltage electrodes of said first type is curved.

24. The electrolysis system of claim 1, wherein each low voltage electrode of said at least one pair of low voltage electrodes of said second type is flat.

25. The electrolysis system of claim 1, wherein each low voltage electrode of said at least one pair of low voltage electrodes of said second type is curved.

26. The electrolysis system of claim 1, wherein each high voltage electrode of said at least one pair of high voltage electrodes is flat.

27. The electrolysis system of claim 1, wherein each high voltage electrode of said at least one pair of high voltage electrodes is curved.

28. The electrolysis system of claim 1, wherein said low voltage source is comprised of a first power supply electrically connected to said at least one pair of low voltage electrodes of said first type and a second power supply electrically connected to said at least one pair of low voltage electrodes of said second type.

29. The electrolysis system of claim 1, wherein the low voltage electrodes of said at least one pair of low voltage electrodes of said first type are positioned parallel to one another.

30. The electrolysis system of claim 1, wherein the low voltage electrodes of said at least one pair of low voltage electrodes of said second type are positioned parallel to one another.

31. The electrolysis system of claim 1, wherein the high voltage electrodes of said at least one pair of high voltage electrodes are positioned parallel to one another.

32. The electrolysis system of claim 1, wherein said specific frequency is between 50 Hz and 5 kHz.

33. The electrolysis system of claim 1, wherein said specific pulse duration is between 10 nanoseconds and 0.5 seconds.

* * * * *